United States Patent [19]
Degoumois

[11] Patent Number: 4,536,961
[45] Date of Patent: Aug. 27, 1985

[54] THREE-DIMENSIONAL MEASURING DEVICE

[75] Inventor: Michel Degoumois, Le Locle, Switzerland

[73] Assignee: Meseltron S. A., Corcelles, Switzerland

[21] Appl. No.: 594,101

[22] Filed: Mar. 28, 1984

[30] Foreign Application Priority Data

Mar. 31, 1983 [CH] Switzerland .......................... 1799/83

[51] Int. Cl.³ .............................................. G01B 7/28
[52] U.S. Cl. .................................... 33/169 R; 33/503; 33/172 E; 33/558
[58] Field of Search ............. 33/169 R, 172 E, 174 L, 33/174 P, 23 K

[56] References Cited
U.S. PATENT DOCUMENTS

| | | | |
|---|---|---|---|
| 3,869,799 | 3/1975 | Neuer et al. | 33/169 R X |
| 3,945,124 | 3/1976 | Jacoby et al. | 33/169 R |
| 4,078,314 | 3/1978 | McMurtry | 33/174 L |
| 4,130,941 | 12/1978 | Amsbury | 33/172 E X |

*Primary Examiner*—Harry N. Haroian
*Attorney, Agent, or Firm*—Peter L. Berger

[57] ABSTRACT

A measuring device is disclosed which contains a sensor fastened to sensor holding elements (4, 5, 6, 7, 8) and suspended so as to be displaceable in relation to a frame (1) in three orthogonal directions (x, y, z).

For each direction of displacement, two parallel moving bridges (11 and 12, 20 and 21, 28 and 24) are provided which are hinged on rigid connecting elements (13, 14, 22, 25). The device permits the return of the sensor to its reference position in the first two directions of displacement (x, y) by gravity or by centering elements provided for that purpose.

28 Claims, 13 Drawing Figures

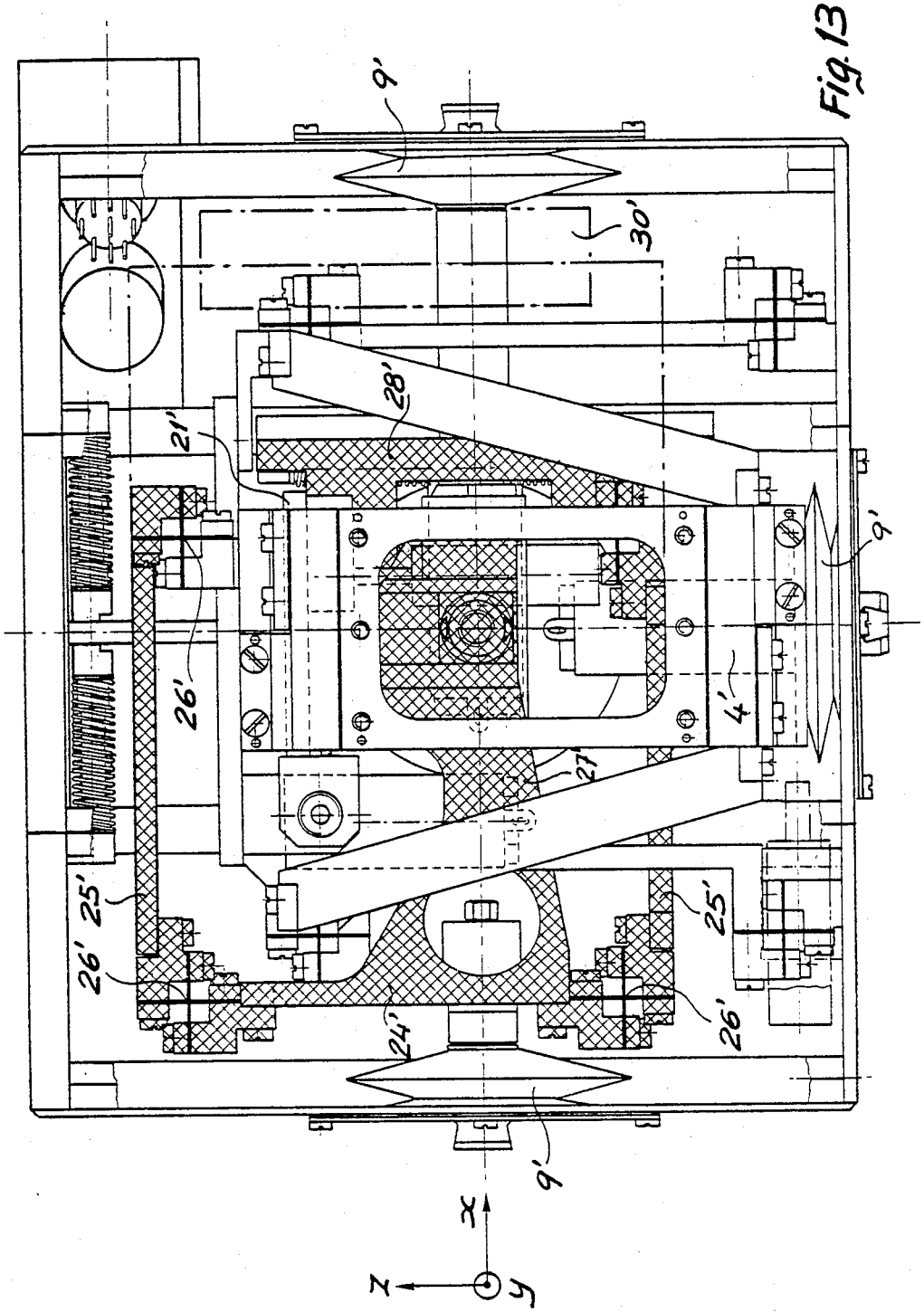

THREE-DIMENSIONAL MEASURING DEVICE

BACKGROUND OF THE INVENTION

This invention concerns a three-dimensional measuring device and relates, in particular, to a measuring head capable of being fastened on a measuring machine and designed to receive at least one measuring sensor. Such devices are intended to be used with measuring machines of every precision category and possibly machine tools.

In general, these devices make it possible to follow continuously the surface of a piece to be measured, and they deliver analog measuring signals representing the position of the point of the surface scanned by the end of a sensor One such device is described, for example, in German Utility Model No. 72 31 877. It comprises at least one measuring sensor suspended by means of a suspension device so as to be able to move in three directions at right angles to a frame. The suspension device contains for each direction of displacement, two moving bridges parallel to each other and joined by two rigid connecting elements hinged on the bridges so as to form a deformable parallelogram with them and a measuring detector provided to measure the relative displacement of the two bridges. However, in that device, the different moving bridges are placed in series under each other, which increases the overall dimensions of the assembly. Furthermore, the different displacement detectors associated with each direction are grouped at the top of the device, which necessitates complex transmission means for transmitting the motion of the different moving bridges to the displacement detectors.

Another measuring device of the type is that of the invention as described in French Patent Application No. 2,311,275. That device is more compact than the preceding one, since it is made up of moving bridges joined in pairs by elastic strips and imbricated in each other to form a parallelepiped. However, there again, the different displacement detectors are grouped at the top of the device, the elastic strips forming the sides of each deformable parallelogram not permitting those detectors to serve as support, nor as support for other useful devices such as, devices blocking certain directions of displacement of the sensor or devices limiting the oscillation of the sensor. Another disadvantage of this device associated with the use of elastic strips connecting the moving bridges in pairs parallel to each other is that the torsional strength of the different parallelograms as well as the return force they exert on the sensor are directly linked to the dimensions and mechanical characteristics of the elastic strips used and cannot then be arbitrarily defined.

That is why an object of this invention is to provide a compact three-dimensional measuring device in which the different deformable parallelograms used are imbricated in each other, but with connecting elements between the moving bridges parallel to each other which are absolutely rigid and articulated to said bridges by any rotary joint and in which the return forces of the device in a reference position are no longer defined by the elasticity of the joints.

SUMMARY OF THE INVENTION

To accomplish this object and others, the suspension device forming part of the three-dimensional measuring device according to the invention contains, for the first direction of displacement of the sensor, a first upper bridge integral with a frame and a first lower bridge; for the second direction, a second upper bridge rigidly connected to the first lower bridge and a second lower bridge, those second bridges being placed in the space separating the first bridges; and for the third direction, a first side bridge rigidly connected to the second lower bridge and a second side bridge, to which is fastened the measurement sensor, which is gravity driven to a reference position in the first and second directions.

The suspension device may also contain, for the first direction, a first upper bridge integral with the frame and a first lower bridge; for the second direction, a second lower bridge rigidly connected to the first upper bridge and a second upper bridge, those second bridges again being placed in the space separating the first bridges; and for the third direction, a first side bridge rigidly connected to the second upper bridge and a second side bridge to which the measuring sensor is fastened. In this case, the measurement device also contains centering means for driving the sensor to a reference position in the first and second directions.

It is thus possible to mount in the very interior of the space defined by the imbricated parallelograms not only all of the displacement measuring detectors but also devices calibrating the return force exerted on the end of the sensor and means for locking, as desired, some of its displacement directions.

Furthermore, the proposed measuring device is capable of receiving a large number of measuring sensors extending not only to the lower part of the device, but also sideways, in at least two perpendicular directions.

BRIEF DESCRIPTION OF THE DRAWINGS

The invention will be understood by reading the following specification, given with reference to the attached drawings, among which:

FIGS. 11 to 13 are views analogous to those of FIGS. 2, 4 and 5, showing a second embodiment of the device according to the invention.

DETAILED DESCRIPTION

Figure 1:
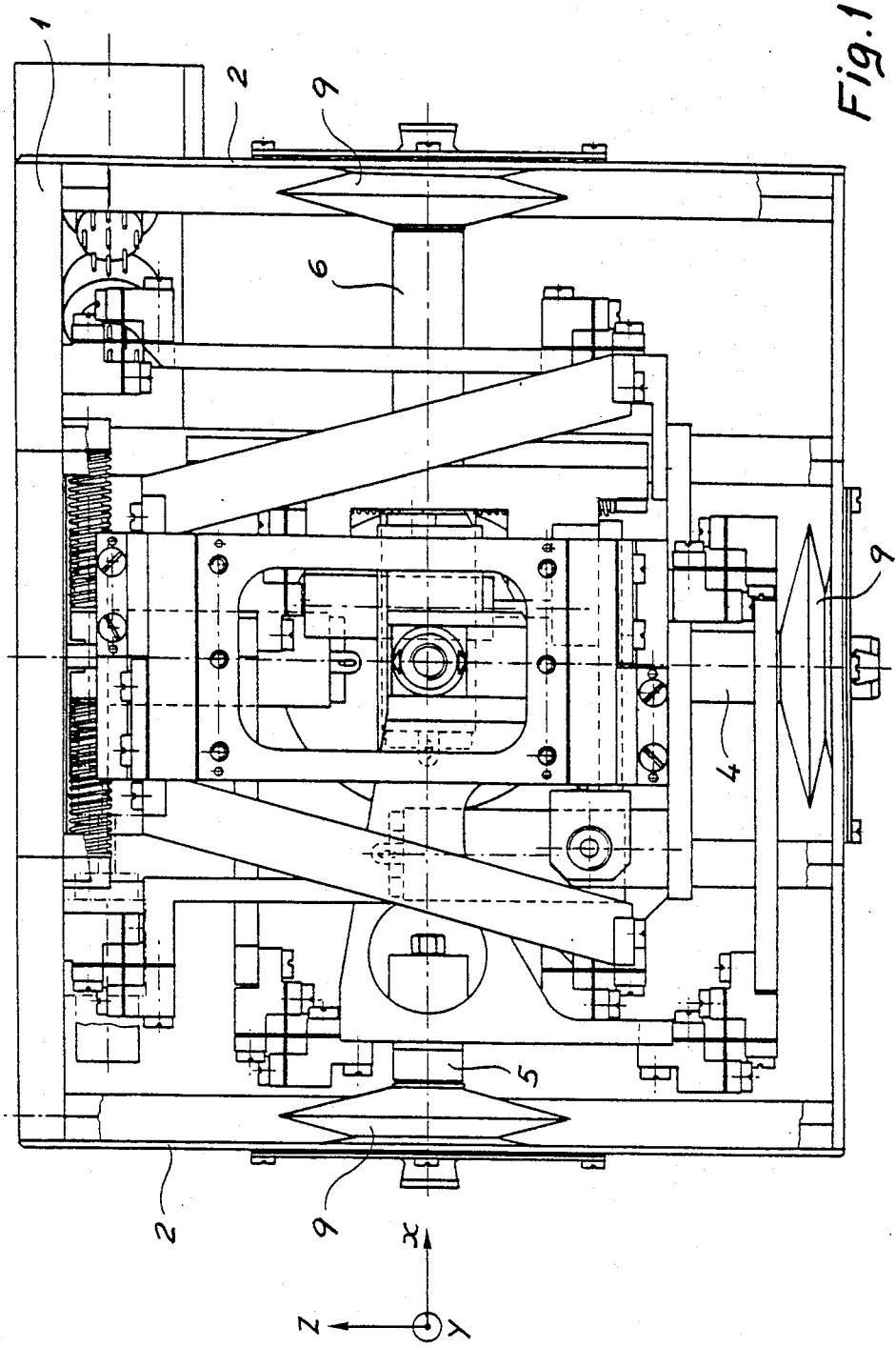
FIG. 1 is an elevational view of a first embodiment of the device according to the invention.
Figure 9:
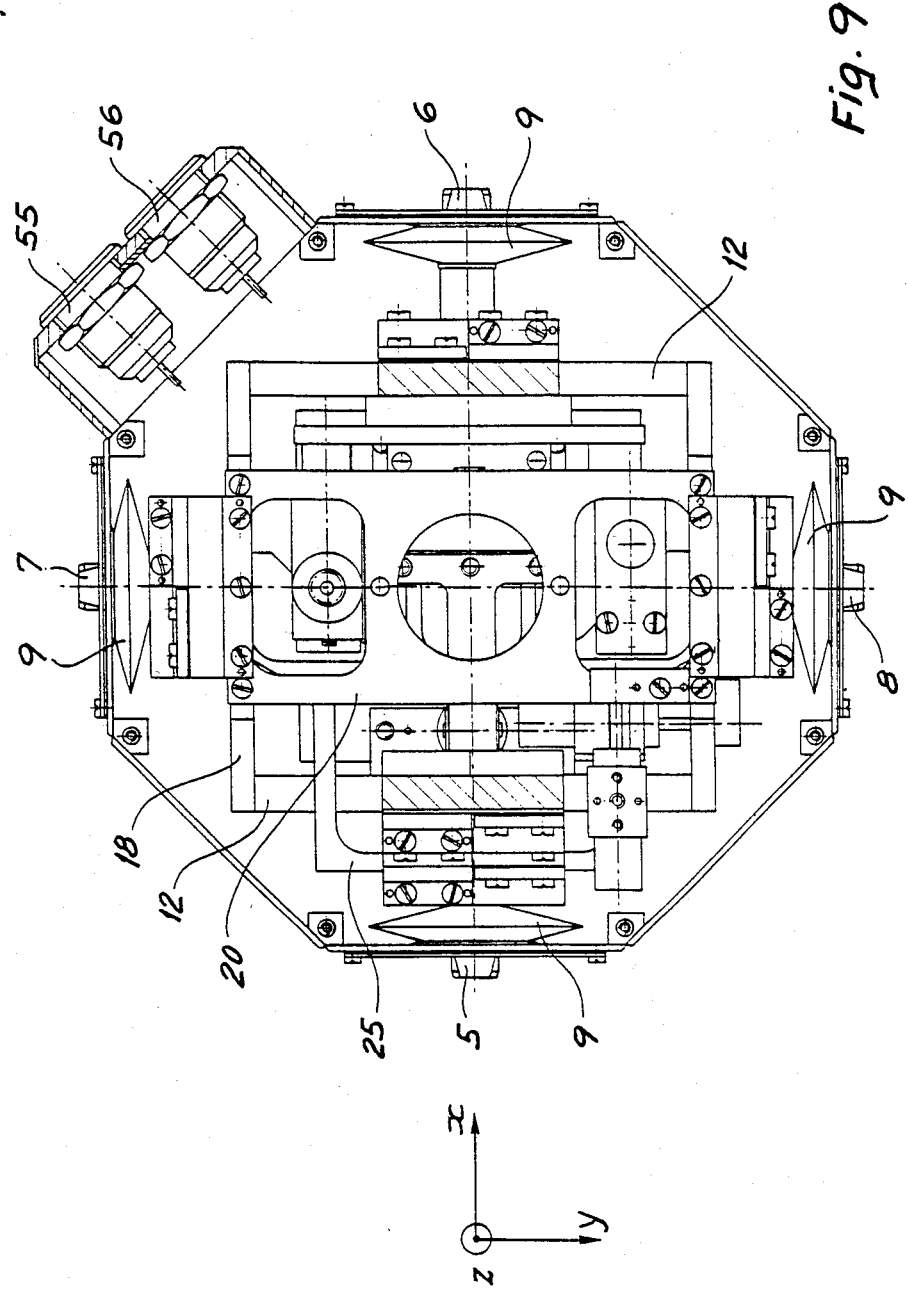
FIGS. 9 and 10 are respectively a plan view and a side view perpendicular to that of FIG. 1 of the device according to the invention.
Figure 10:
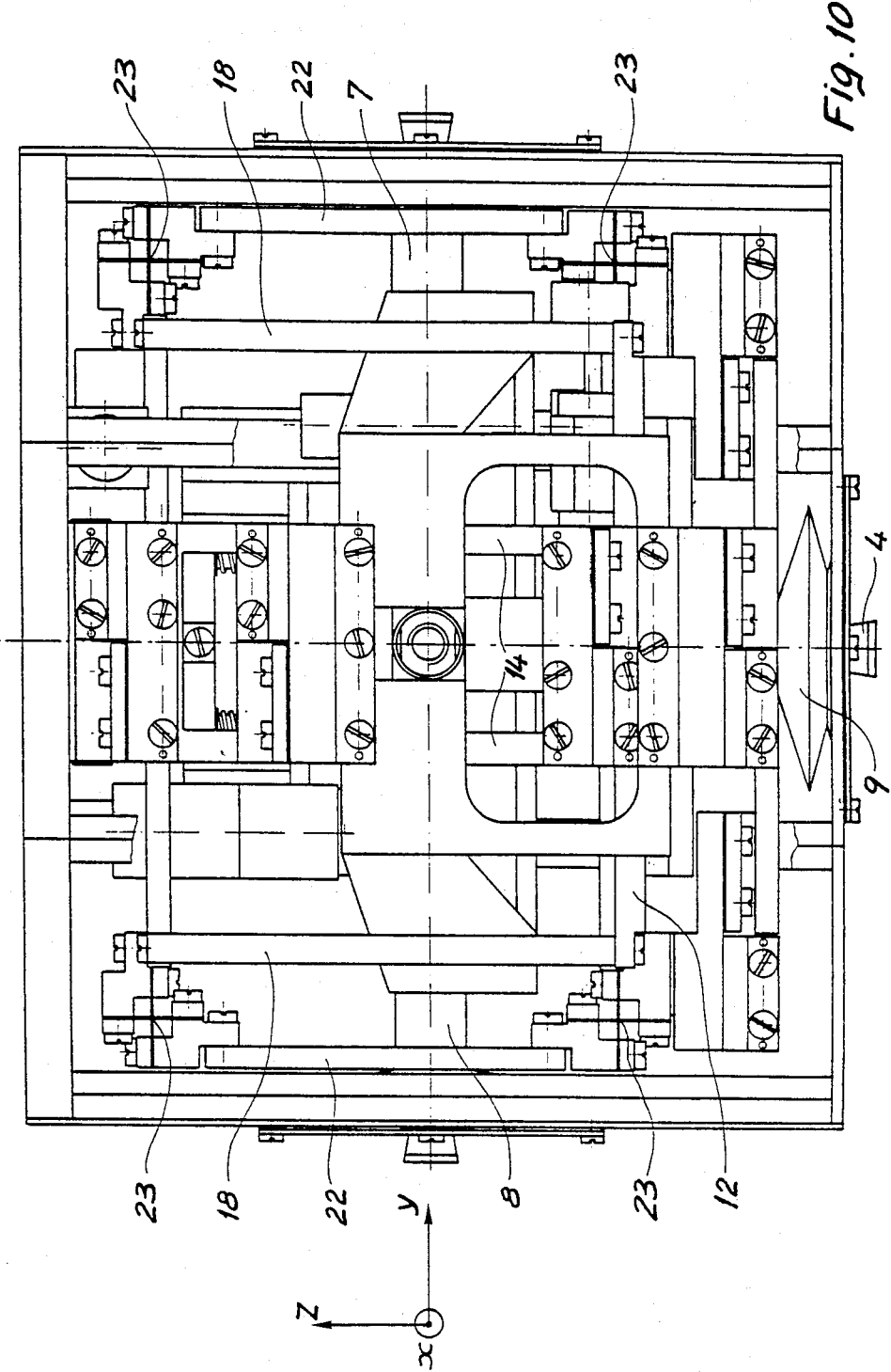

Referring, first of all, to FIGS. 1, 9 and 10, it can be seen that the device represented there contains a frame 1, capable of being fastened, for example, to a measuring machine and to which the entire mechanism of the device is connected. It is all contained in a hexagon-shaped case enclosed by walls 2. The device permits suspension in the case of a sensor (not represented) capable of being fastened to any one of the five sensor holding elements, one of which permits the placement of one or more sensors at the bottom of the case, while the other sensor holding elements 5, 6, 7 and 8 permit the placement of sensors on both sides of the lateral faces of the cases, along two orthogonal directions. The case is hermetically sealed and its dust-tightness at the outlets of the sensors is assured by an elastic bellows 9.

As will be seen in greater detail below, the suspension device included in the case contains, for each direction of displacement, two moving bridges parallel to each other and joined by two rigid connecting elements hinged on the bridges, so as to form a deformable frame with them. The joints chosen for the embodiment described consist of crossed elastic strips, but other joint embodiments could just as well be used, such as smooth bearings, ball bearings, bearings equipped with ball bearings or flexible bearings with strips that are not crossed. In the case of crossed strips, two pieces joined to each other are connected by two elastic strips, placed beside each other or imbricated and mounted perpendicularly, each being detachably fastened to each of the connected pieces, for example, by two screws.

Figure 2:
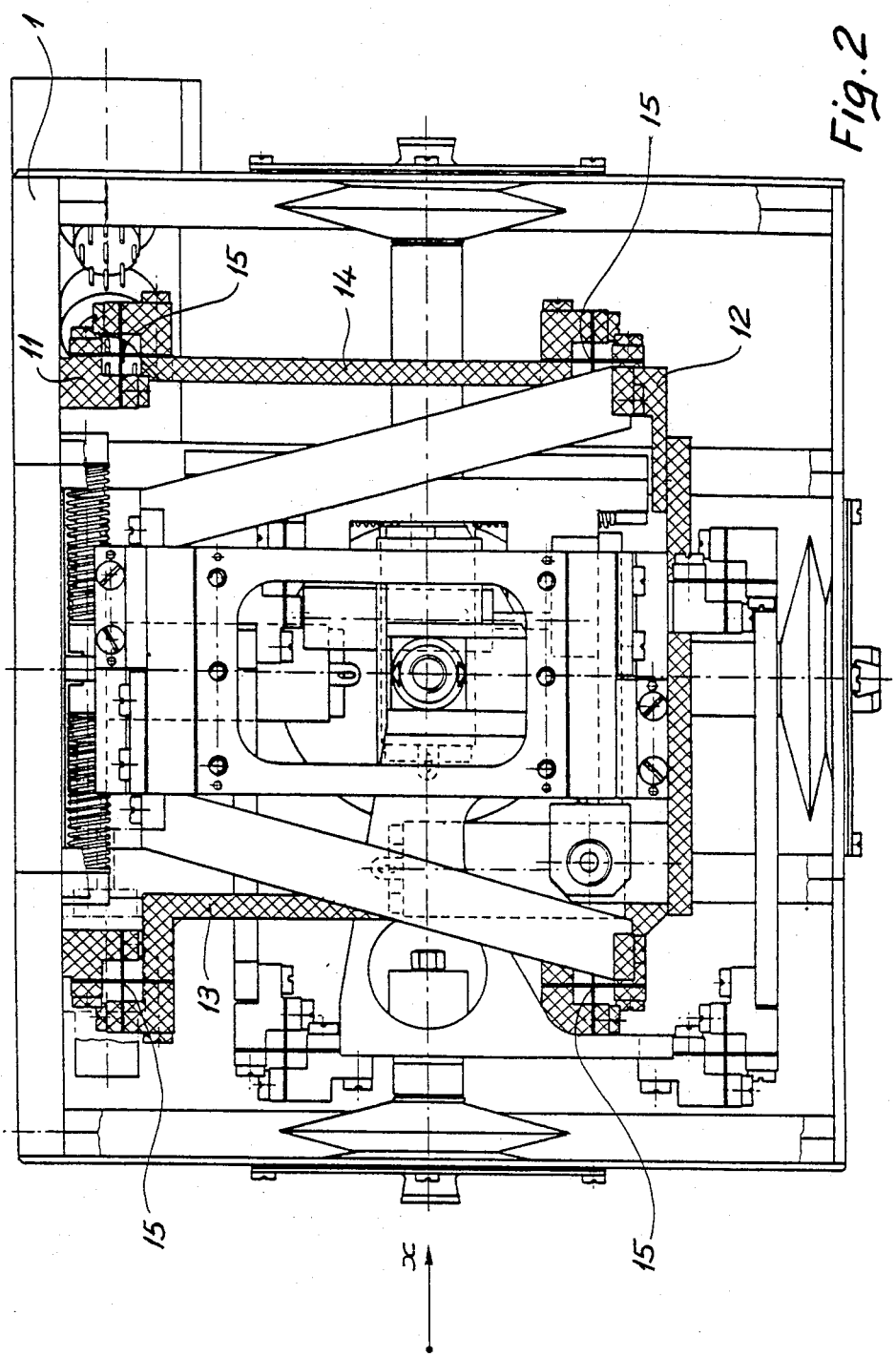
FIGS. 2 to 6 and 8 are views identical to that of FIG. 1, in which particular elements have been distinctively represented.

On FIG. 2 the elements of the suspension device moving a measuring sensor in the x direction is represented by cross-hatchings. These elements consist of a first upper bridge 11 integral with the frame 1 and a first lower bridge 12. Those two bridges are linked by vertical rigid connecting elements 13 and 14, jointed on the bridges 11 and 12 by means of joints with crossed elastic strips 15. In this way, the first lower bridge 12 is displaced parallel to the first upper bridge 11 and it is brought back to a reference balance position by gravity, the elastic return force of the joints with crossed strips not being necessary for that.

Figure 3:
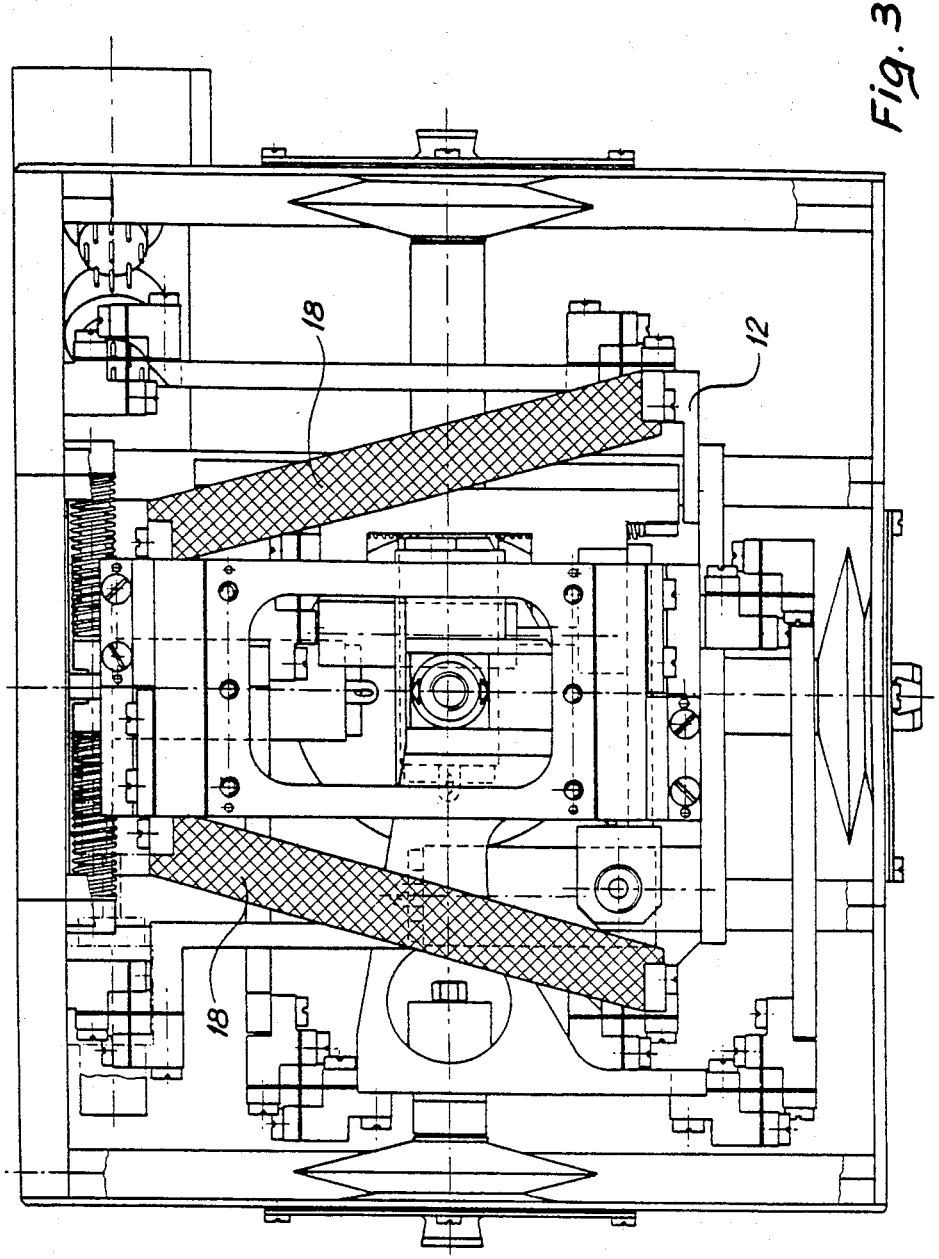

On FIG. 3 a reversing bridge formed by the elements rigidly connected to the first lower bridge 12 has been represented by cross-hatching. The reversing bridge 18 simply makes it possible to bring the motion of the first lower bridge 12 back to the upper part of the device, in order to permit the suspension elements associated with the second direction of displacement y as well, so that the force of gravity exerts the same return effect on them as for the first direction of displacement x.

Figure 4:
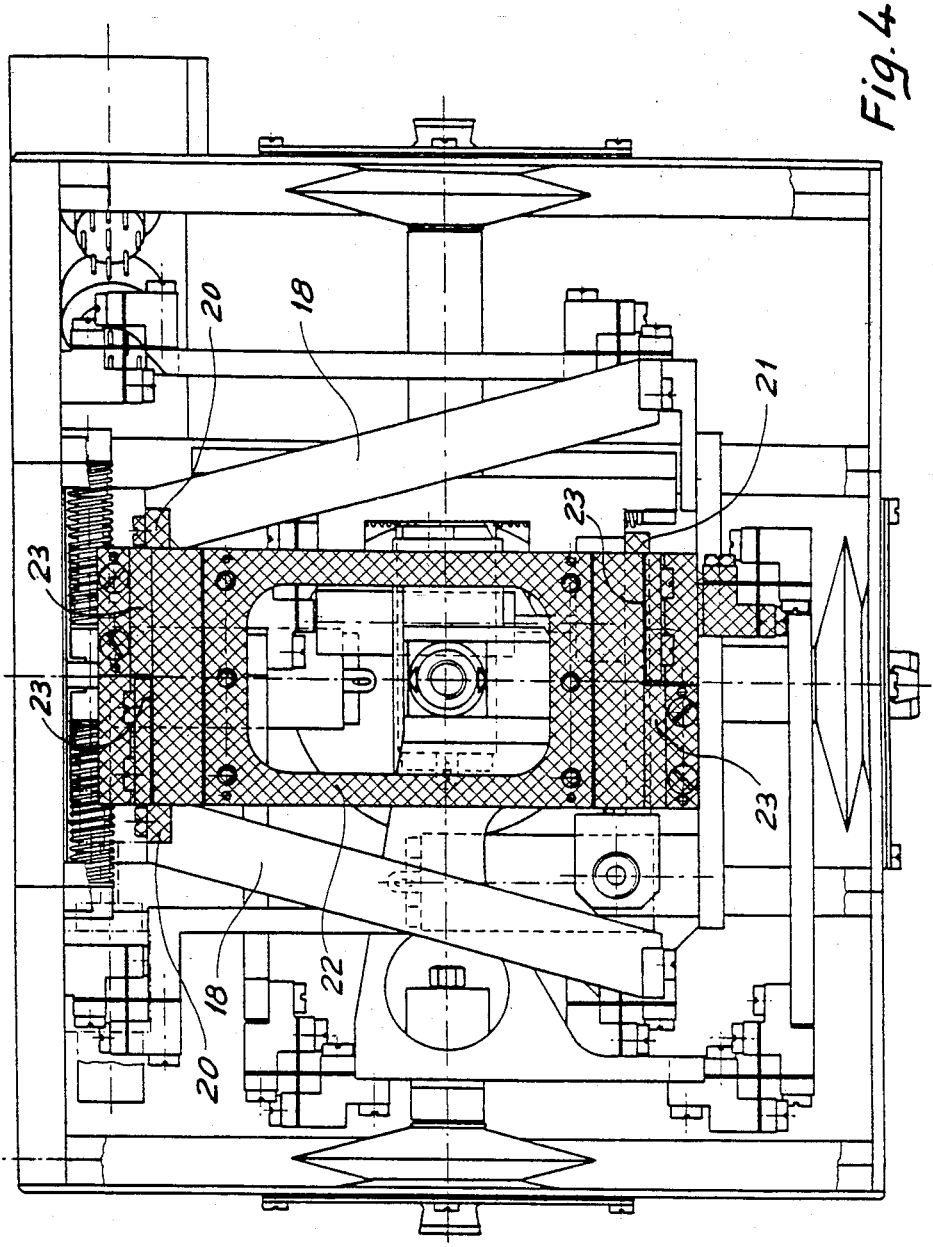

The elements of the suspension device assuring displacement in direction y of the measuring sensors are represented on FIG. 4. Those elements consist of a second upper bridge 20, rigidly fastened to the reversing bridge 18, and a second lower bridge 21 arranged in the space separating the first bridges 11 and 12. Bridges 20 and 21 are linked to rigid connecting elements 22, as previously, by joints with crossed strips 23. It is clearly evident from this figure that the rigid connecting elements 22 can come in any form and, notably, be perforated to permit passage of a sensor holding element to one of the side walls of the case.

Figure 5:
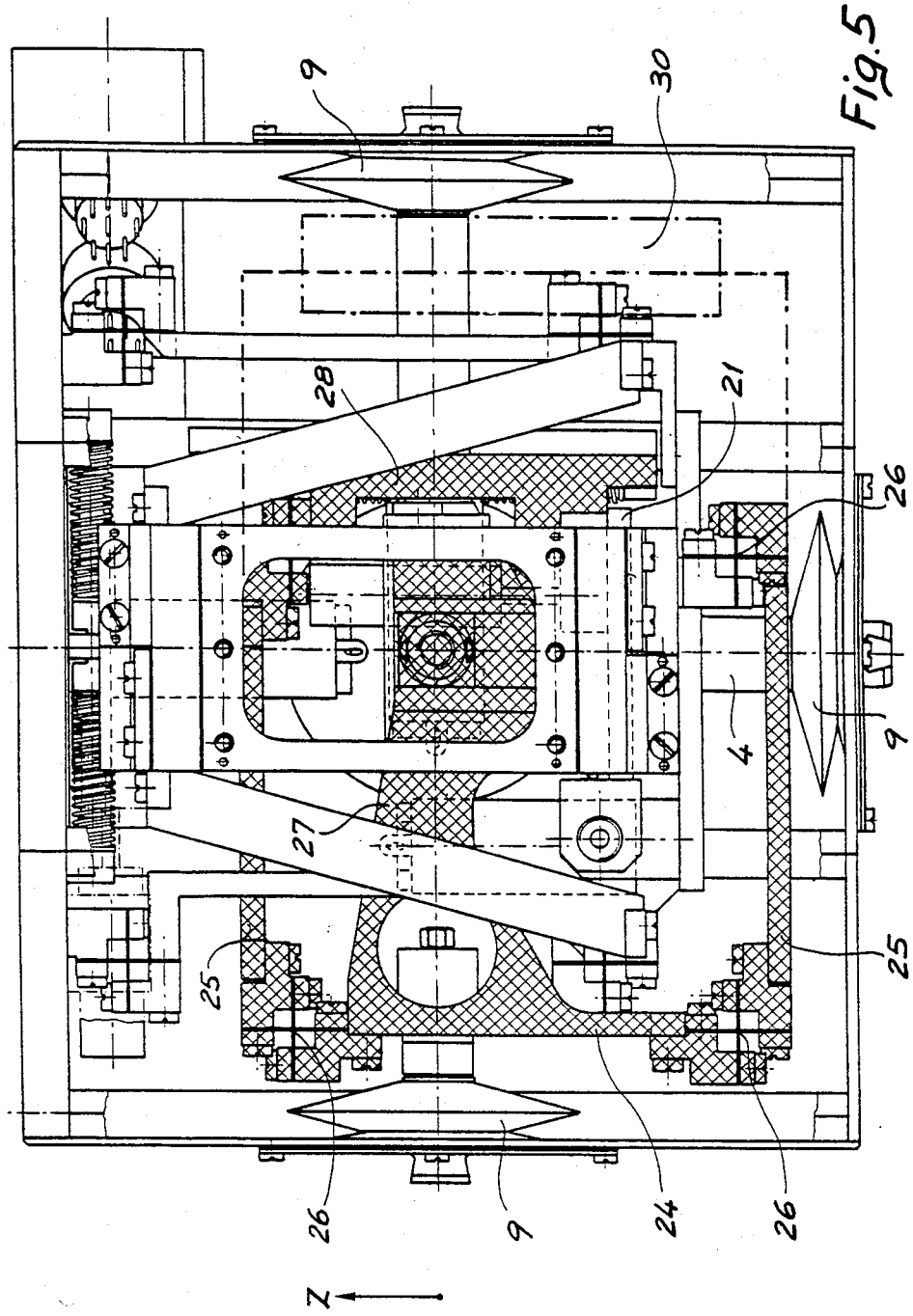

Finally, the suspension elements permitting displacement along the z axis of the different measuring sensors have been represented in FIG. 5. For that purpose, the device contains a first side bridge 28 rigidly joined to the second lower bridge 21 and a second side bridge 24 linked to the previous one by connecting elements 25 joined on the bridges by bearings with crossed strips 26.

The second side bridge 24 serves as support for the different sensor holding elements. For reasons of convenience, the second side bridge 24 presents a projection 27 extending to near the center of the device which serves as a support for the lower and lateral sensor holding elements not situated in immediate proximity to the vertical part of the side bridge 25. In the same way, to permit passage of the lower sensor holding element 4, the lower connecting element 25 roughly defines a triangular shape, the vertex of which is jointed at a point on the second side bridge 24 and the base of which is connected to the two side ends of the first side bridge 28, the center of the triangle thus being free.

Normally, the rest position of the suspension elements associated with the z direction is defined solely by the reaction of the strips of the bearings with crossed strips 26 and the stresses applied by the sealing bellows 9. In this invention, it is arranged to relieve those elements by means of a balancing device exerting a force on the second side bridge which is opposed to its weight so as to drive it to its reference position.

The simplest way of accomplishing this balancing is represented by the lines of dots and dashes on FIG. 5, which represent a counterweight 30 joined to the connecting elements 25. When the counterweight is joined to both elements 25, it is advisable to connect it by means of rotary joints on those pieces in order to preserve the geometry of the assembly, but in case the counterweight is joined to only one intermediate element, a rigid connection is sufficient.

Alternatively, the counterweight could also be replaced by a motor exerting an adjustable tension on one or more springs acting on the side bridge 24.

Figure 6:
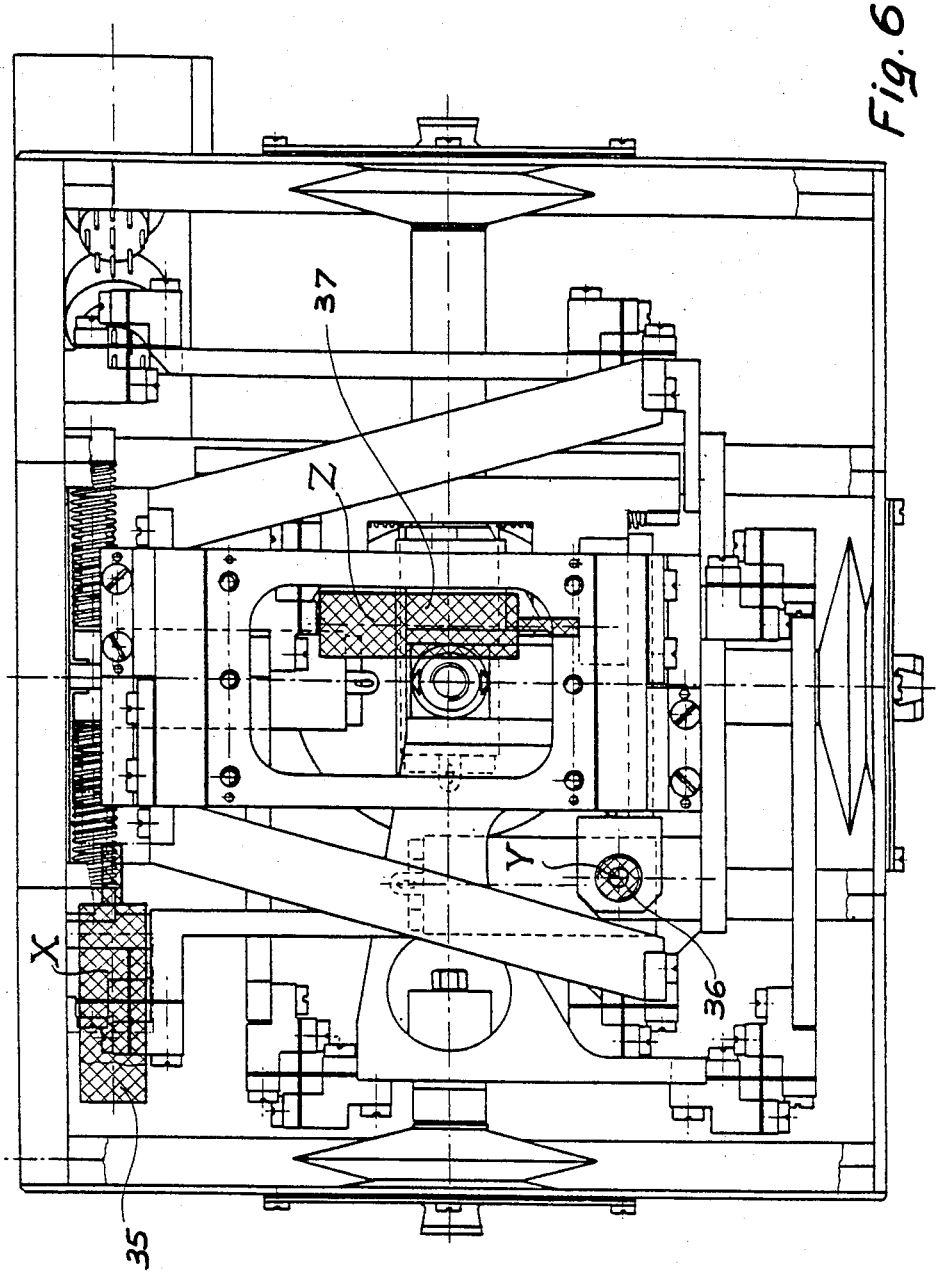

The position of the different transducers 35, 36 and 37, making possible measurements of the displacement of the sensors in directions x, y and z respectively has been represented by means of cross hatching on FIG. 6. Those measuring detectors consist preferably of inductive detectors including, on one side, a coil integral with one of the bridges associated with each direction of displacement into which a ferrite core integral with the other bridge moves which is displaced parallel to the first.

In the first described embodiment, the device according to the invention is equipped for each displacement arrangement with a limiting device designed to limit the oscillations of the sensor in that direction of displacement and assign it a rest position and to define the bearing force of the sensor on the surface to be measured necessary to produce a displacement of the sensor. As can best be seen in FIG. 7, a limiting device comprises two bearing pieces 40 and 41, mounted on one of the bridges associated with one direction, so as to be displaceable in that same direction. For example, the $\Omega$-shaped bearing pieces 40 and 41 slide on spindles 42 and are driven toward each other under the effect of springs 43 crossed by the spindles 42. The bearing pieces 40 and 41 are supported under the effect of springs 43 on both sides of fixed positioning stops 44, defining the rest position of pieces 40 and 41. In addition, one or more moving pins 45 which are connected to the second bridge of the suspension device associated with the given direction, are arranged so as to move either of the bearing pieces 40 and 41 against the force exerted by the return springs 43, when the sensor is displaced in the direction concerned.

Thus, untimely oscillations of the sensor are avoided, since a force greater than that defined by the spring 43 is necessary to displace it in either direction. The $\Omega$-shape of the bearing pieces 40 and 41 is particularly important, insofar as it enables a passage to be freed in the center, e.g., for a sensor holding element. Finally, it is to be noted that the spindles 42 are not absolutely necessary, but that they are useful in order to avoid a maladjustment of the device in case of shock.

Figure 7:
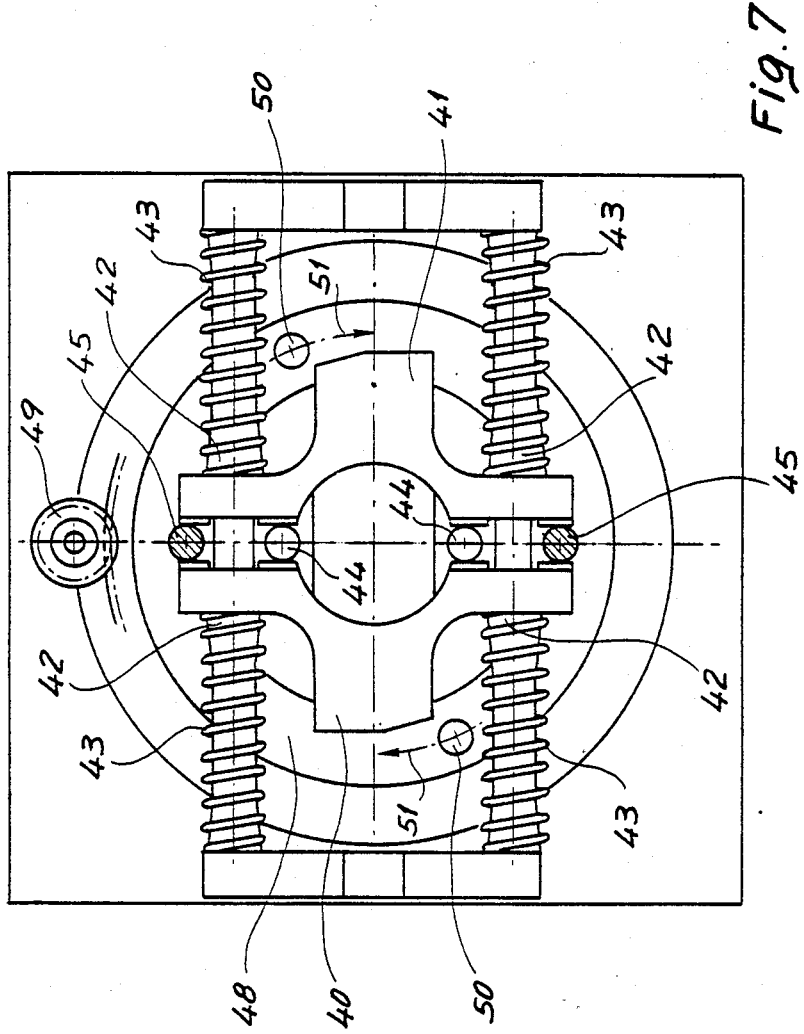
FIG. 7 is a plan view of a limiting device included in the apparatus according to the invention.

Finally, the device of FIG. 7 further contains blocking means making it possible to block the bearing pieces 40 and 41 temporarily and thus bar the corresponding direction of displacement of the sensor. These blocking means include a crown 48 capable of being rotated, for example, by means of a pinion 49 driven by an electric motor between a free position, represented on the figure, where the bearing pieces are free to move by separating from the positioning stops 44 and a blocking position in which blocking stops 50 are moved in the direction of arrows 51 in order to be placed in the path of bearing pieces 40 and 41 and thus prevent their displacement.

Figure 8:
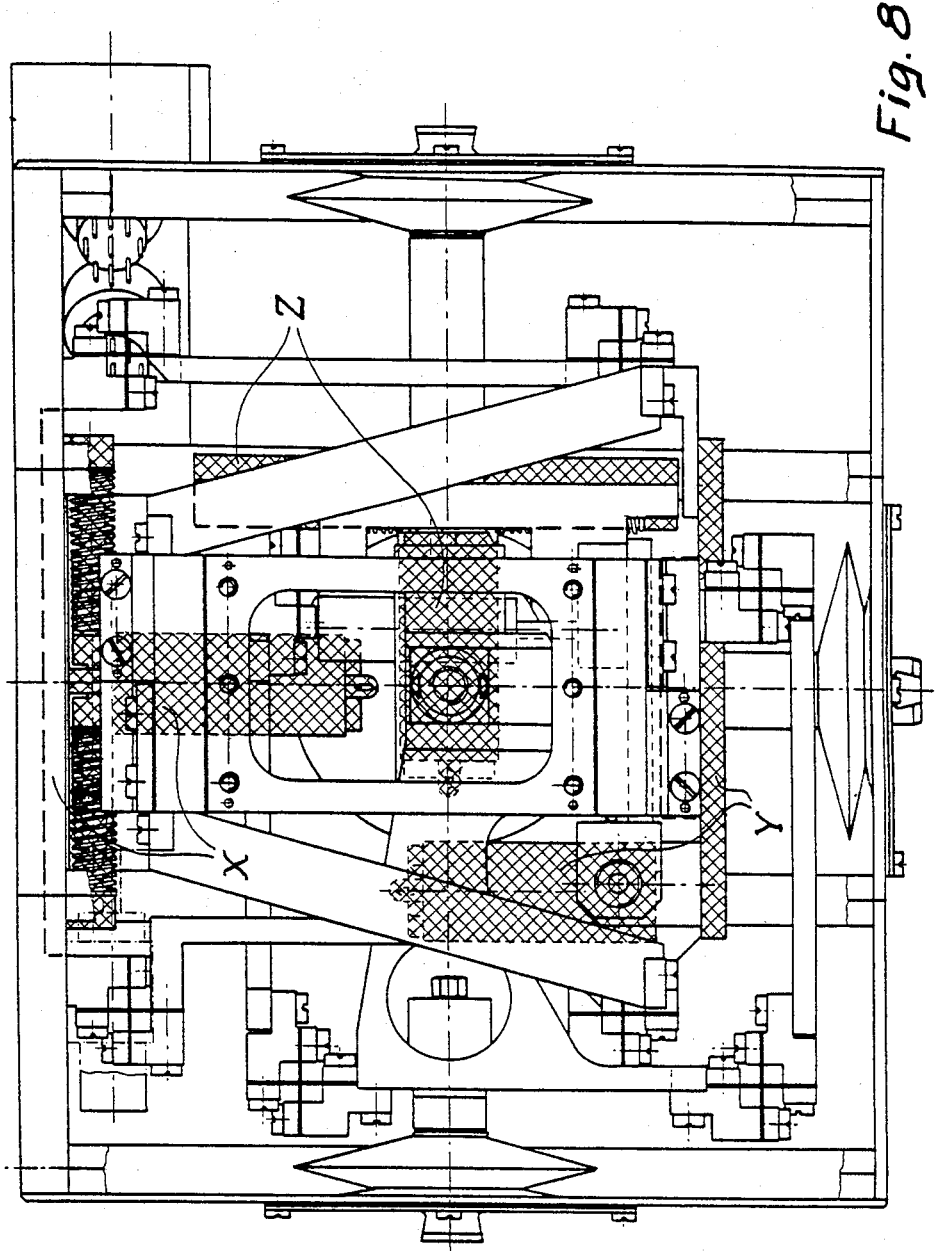

FIG. 8 more specifically shows the layout of the different limiting devices and that of the associated electric motors inside the device according to the invention.

In the operating mode, the device according to the invention is connected to a control device. e.g., by means of pins 55 and 56 of FIG. 9 so as to control the different motors assuring blocking or release of the displacement spindles of the sensor. In addition, the control device collects the signals emitted by the displacement measuring detectors in order to use those signals, for example, for guiding the displacement of the measuring machine itself.

The above embodiment is satisfactory when the assembly formed by the suspension device and the elements it supports remain relatively light. When the weight of that assembly is increased, notably, by using heavier materials to make the suspension system, it frequently occurs that gravity no longer reliably returns the bridges associated with the first and second positions to their reference balance position.

A solution to that problem consists of turning the suspension device around, that is, turning it 180° on an axis parallel to one of the horizontal directions of displacement, e.g., to direction x, and of providing centering elements for those two directions, which elements can advantageously consist of oscillation limiting devices, such as the one previously described with reference to FIG. 7.

Figure 11:
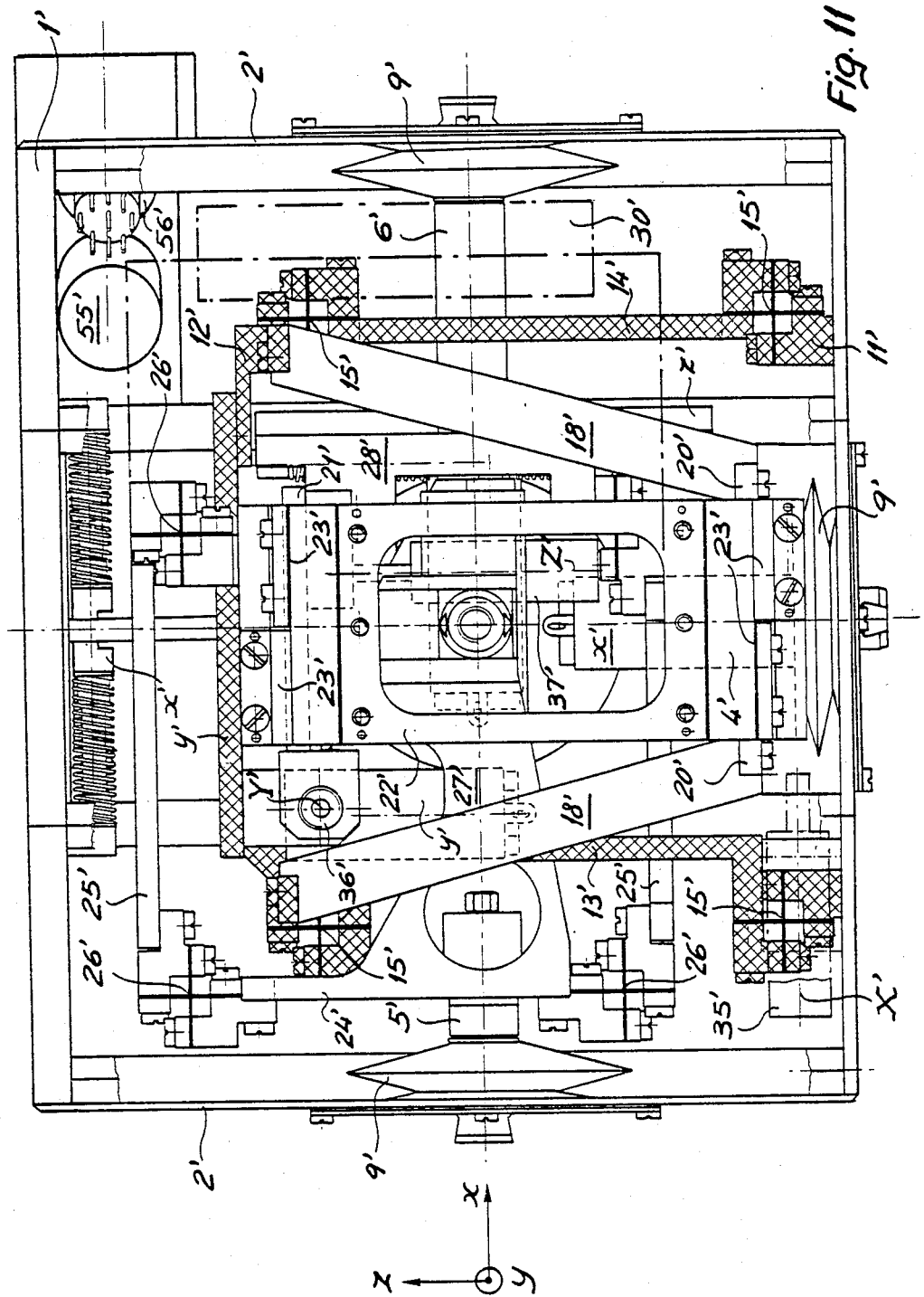
Figure 12:
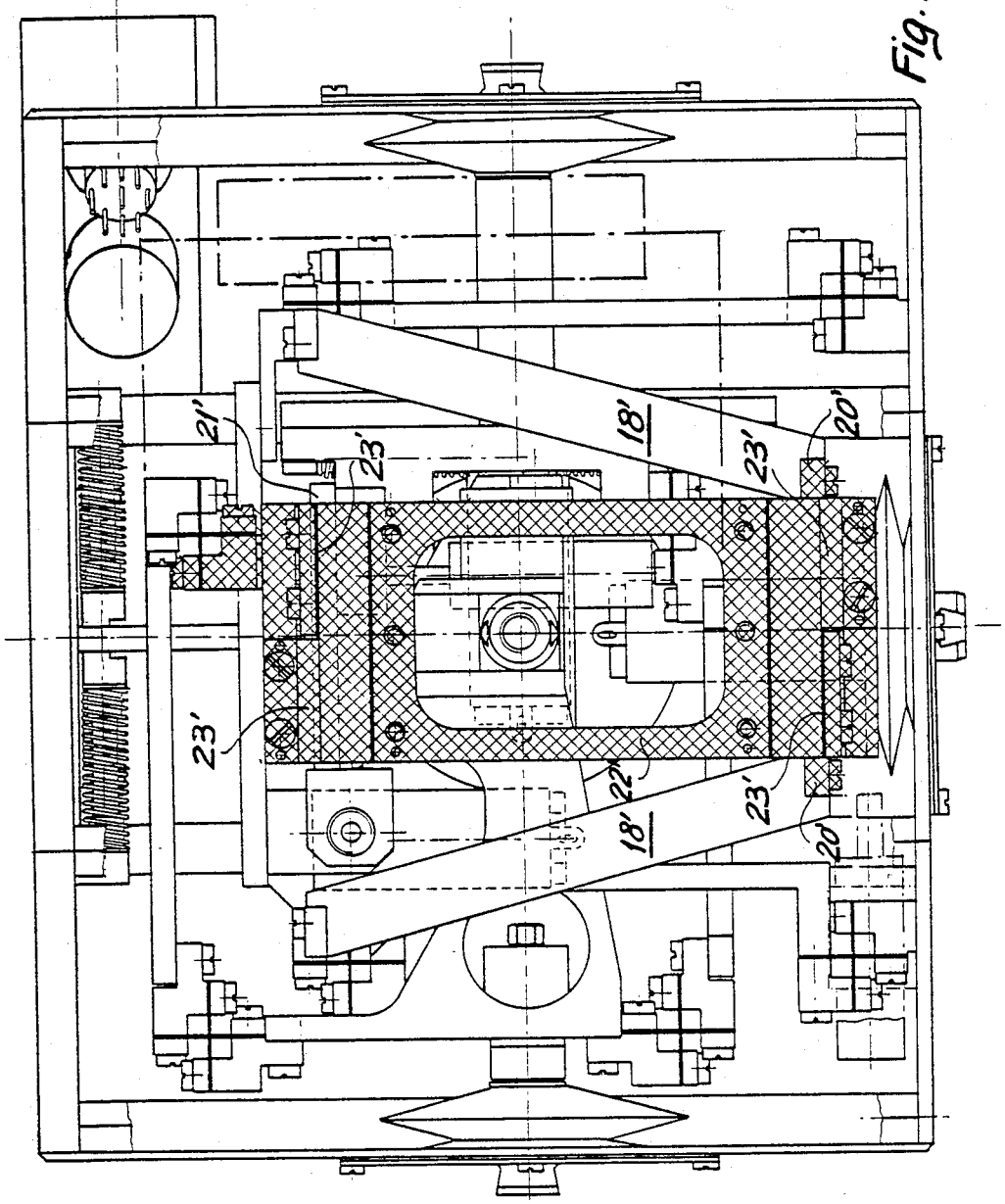

This modification provides another embodiment of the measuring device according to the invention which is shown on FIGS. 11 to 13. All of the elements of the first embodiments which are carried in the second are designated by the same references with a prime sign. Parts of the device like the sensor holding elements 4', 5', 6', 7' and 8' or the pins 55' and 56' for control of the motors maintain, of course, the same position as in the first embodiment. On the other hand, other components such as detectors 35', 36' and 37' for measurement of the displacement of the sensors in directions y and z or the limiting devices for those same directions are fixed in relation to the suspension device, that is, they have been turned by 180°. As for the limiting device associated with direction x, it is preferable for it to remain placed at the top of the case 1'.

This second embodiment will not be described in further detail, for it is sufficient to replace the qualifier upper by lower and vice versa for the bridges associated with displacement directions x and y, to add the prime sign to the references, except as far as the components of the limiting devices are concerned and to delete the statements about the role of gravity for definition of the reference positions, so that everything else stated about the first embodiment is equally applicable to the second.

Finally, the invention is very clearly not limited to those two embodiments, but lends itself rather to numerous modifications and variations which will be evident to the expert.

What is claimed is:

1. A three-dimensional measuring device containing at least one measuring sensor suspended by means of a suspension device, so as to be simultaneously displaceable in three orthogonal directions identified as x, y and z at right angles to a frame, that suspension device comprising, for each direction of displacement two moving bridges parallel to each other and joined by two rigid connecting elements hinged on the bridges so as to form a deformable frame, and a measuring detector to measure the relative displacement of the two bridges, characterized in that the suspension device comprises for the x direction a first upper bridge integral with the frame and a first lower bridge, for the y direction a second upper bridge rigidly connected to the first lower bridge and a second lower bridge, those second bridges located in the space separating the first upper and lower bridges, and for the z direction a first side bridge rigidly connected to the second lower bridge and a second side bridge to which said measuring sensor is fastened, said measuring sensor being moved to a reference position in the first two directions by gravity.

2. A device according to claim 1, wherein the measuring sensor is moved to a reference position in the third direction by a balancing device exerting on the second side bridge a force opposite to its weight.

3. A device according to claim 2, wherein the balancing device comprises a counterweight joined to the connecting elements linking the two side bridges.

4. A device according to claim 2, wherein the balancing device comprises a motor regulating the tensile force of at least one spring acting on the second side bridge.

5. A device according to claim 1, wherein the second side bridge comprises a projection extending to near the center of the device serving as support for at least two sensor holding elements used for mounting measuring sensors extending outside the device in different directions.

6. A device according to claim 1, wherein the connecting element joining the two side bridges at the bottom defines an approximate triangular shape, the vertex being jointed at a point on the second side bridge and the base at the two ends of the first side bridge, the center being free to leave passage for a lower sensor holding element.

7. A device according to claim 1, wherein said device comprises at least one limiting device to limit the oscillations of the sensor in one of its directions of displacement and assign it a rest position and to define its bearing force on the surface of a piece to be measured, that limiting device comprising two bearing pieces mounted on one of the bridges associated with that direction, to be displaceable in that same direction driven toward each other under the effect of springs and supported on both sides of positioning stops that are fixed in relation to that bridge and at least one pin that is fixed in relation to the second bridge associated with that direction and acting on said bearing pieces on displacements of the sensor in that direction to displace them on both sides of their rest position bearing against the positioning stops.

8. A device according to claim 7, wherein the bearing pieces are $\Omega$-shaped and are placed so as to define a passage between them.

9. A device according to claim 7, wherein the limiting device further comprises blocking means for temporarily blocking the bearing pieces against the positioning stops.

10. A device according to claim 8, wherein the limiting device further comprises blocking means for temporarily blocking the bearing pieces against the positioning stops.

11. A device according to claim 9, wherein said blocking means include a crown equipped with blocking stops capable of being driven in rotation between a blocking position where the blocking stops are arranged on the path of the bearing pieces in order to prevent them from leaving their support against the positioning stops and a free position where the blocking stops are separated from the path of the bearing pieces.

12. A device according to claim 10, wherein said blocking means include a crown equipped with blocking stops capable of being driven in rotation between a blocking position where the blocking stops are arranged on the path of the bearing pieces in order to prevent them from leaving their support against the positioning stops and a free position where the blocking stops are separated from the path of the bearing pieces.

13. A device according to claim 11, wherein the crown is driven by an electric motor.

14. A device according to claim 12, wherein the crown is driven by an electric motor.

15. A device according to claim 7, wherein said device comprises a limiting device for each direction of displacement of the sensor.

16. A three-dimensional measuring device comprising at least one measuring sensor suspended by means of a suspension device so as to be able to move simultaneously in three orthogonal directions x, y and z at right angles to a frame, that suspension device containing, for each direction of displacement two moving bridges parallel to each other and joined by two rigid connecting elements hinged on the bridges so as to form a deformable frame, and a measuring detector to measure the relative displacement of the two bridges characterized in that the suspension device comprises, for the x direction, a first upper bridge integral with the frame and a first lower bridge, for the y direction, a second lower bridge rigidly connected to the first upper bridge and a second upper bridge, those second bridges located in the space separating the first upper and lower bridges and, for the z direction a first side bridge rigidly connected to the second upper bridge and a second side bridge to which the measuring sensor is fastened, said measuring device further comprises centering means for driving said sensor to a reference position in said first and second directions.

17. A device according to claim 14, wherein the measuring sensor is driven to a reference position in the third direction by a balancing device exerting on the second side bridge a force opposite to its weight.

18. A device according to claim 17, wherein the balancing device comprises a counterweight joined to the connecting elements coupling the two side bridges.

19. A device according to claim 17, wherein the balancing device comprises a motor regulating the tensile force of at least one spring acting on the second side bridge.

20. A device according to claim 16, wherein the second side bridge contains a projection extending to near the center of the device serving as support for at least two sensor holding elements used for mounting measuring sensors extending outside the device in different directions.

21. A device according to claim 16, wherein the connecting element joining the two side bridges at the bottom defines an approximate triangular shape, the vertex being jointed at a point on the second side bridge and the base at the two ends of the first side bridge, the center being free to leave passage for a lower sensor holding element.

22. A device according to claim 16, wherein said device comprises at least two limiting devices to limit the oscillations of the sensor in the x and y directions and assign it a rest position and to define its bearing force on the surface of a piece to be measured, each limiting device comprising two bearing pieces mounted on one of the bridges associated with the corresponding direction to be displaceable in that direction driven toward each other under the effect of springs and supported on both sides of positioning stops that are fixed in relation to that bridge and at least one pin that is fixed in relation to the second bridge associated with that direction and acting on said bearing pieces on displacements of the sensor in that direction to displace them on both sides of their rest position bearing against the positioning stops.

23. A device according to claim 22, wherein said centering means includes the said limiting devices.

24. A device according to claim 22, wherein the bearing pieces are $\Omega$-shaped and are placed so as to define a passage between them.

25. A device according to claim 22, wherein each limiting device further comprises blocking means for temporarily blocking the bearing pieces against the positioning stops.

26. A device according to claim 25, wherein said blocking means include a crown equipped with blocking stops capable of being driven in rotation between a blocking position where the blocking stops are arranged in the path of the bearing pieces to prevent them from leaving their support against the positioning stops and a free position where the blocking stops are separated from the path of the bearing pieces.

27. A device according to claim 26, wherein the crown is driven by an electric motor.

28. A device according to claim 22, wherein said device includes a limiting device for the z direction of displacement of the sensor.

* * * * *